(12) United States Patent
Lu (10) Patent No.: US 9,889,627 B2
(45) Date of Patent: Feb. 13, 2018

(54) COMBINED ANTI-SLIP FLOOR MAT

(71) Applicant: Xiamen Sheep Anti-Fatigue Mat Co., Ltd., Xiamen (CN)

(72) Inventor: Xiangyang Lu, Xiamen (CN)

(73) Assignee: XIAMEN SHEEP ANTI-FATIGUE MAT CO., LTD., Xiamen (CN)

( * ) Notice: Subject to any disclaimer, the term of this patent is extended or adjusted under 35 U.S.C. 154(b) by 0 days.

(21) Appl. No.: 15/163,648

(22) Filed: May 24, 2016

(65) Prior Publication Data

US 2016/0368239 A1    Dec. 22, 2016

Related U.S. Application Data

(63) Continuation-in-part of application No. 14/774,144, filed on Sep. 10, 2015.

(51) Int. Cl.
| | |
|---|---|
| *B32B 3/24* | (2006.01) |
| *B32B 3/26* | (2006.01) |
| *B32B 3/28* | (2006.01) |
| *B32B 5/18* | (2006.01) |
| *B32B 7/08* | (2006.01) |
| *B32B 9/02* | (2006.01) |
| *E04F 15/02* | (2006.01) |
| *A47G 27/02* | (2006.01) |

(52) U.S. Cl.
CPC .......... *B32B 3/266* (2013.01); *A47G 27/0212* (2013.01); *B32B 3/28* (2013.01); *B32B 5/18* (2013.01); *B32B 7/08* (2013.01); *B32B 9/025* (2013.01); *E04F 15/02172* (2013.01); *B32B 2266/0278* (2013.01); *B32B 2307/744* (2013.01); *B32B 2419/04* (2013.01); *Y10T 428/24339* (2015.01); *Y10T 428/24347* (2015.01)

(58) Field of Classification Search
CPC ..... Y10T 428/24339; Y10T 428/24347; B32B 3/266
See application file for complete search history.

(56) References Cited

U.S. PATENT DOCUMENTS

| | | | | |
|---|---|---|---|---|
| 3,930,084 | A | * 12/1975 | Shields | B29D 99/0057 156/298 |
| 2005/0129910 | A1 | * 6/2005 | Chang | B32B 3/26 428/139 |
| 2010/0124630 | A1 | * 5/2010 | Assil | B32B 3/10 428/138 |

FOREIGN PATENT DOCUMENTS

CN             201899312 U   *  7/2011

* cited by examiner

*Primary Examiner* — William P Watkins, III
(74) *Attorney, Agent, or Firm* — Gokalp Bayramoglu (57) ABSTRACT

A combined anti-slip floor mat, including a mat body and a little mat, the mat body includes a leather, a PU self-skinning layer, and an anti-slip layer stacked together m that order. A recess is disposed in the middle of the top of the mat body, and the area of the recess is slightly less than the top area of the mat body; the little mat is matched to the recess in size. At least one opening is disposed on the middle of each side of the recess; wherein the opening passes through the floor mat; a cross notch is made on the bottom of the floor mat, by connecting each two opponent openings; the size of the little mat matches the recess on the mat body, and is separably embedded in the recess.

18 Claims, 6 Drawing Sheets

COMBINED ANTI-SLIP FLOOR MAT

CROSS-REFERENCE TO RELATED APPLICATIONS

This application claims the benefit under 35 U.S.C. § 120 as a continuation-in-part (CIP) of U.S. Non-Provisional patent application Ser. No 14/774,144, filed Sep. 10, 2015, the disclosure of which is incorporated by reference in its entirety.

TECHNICAL FIELD

This invention relates to the technical field of floor mat, more specially, relates to a combined anti-slip floor mat.

BACKGROUND

Nowadays, there are more and more various of floor mats. Most of them are directly foamed by the polyurethane. Such PU floor mat has the advantages of good elasticity and foot feels, ease to clean and environmental friendly. However, such PU floor mat cannot be directly used in a damp environment, such as kitchen, bathroom, etc., because the friction between the floor mat and the ground is too mall, which lower the safety of the floor mat. In order to solve the problem of slipping, people tend to add an anti-slip foaming layer directly on the bottom surface of the PU floor mat. The anti-slip foaming layer is made of choroprene rubber, styrenebutadiene rubber, heat-shrink elastomer foaming layer or rubber foaming layer. Slip resistance of the floor mat gets enhanced by applying the anti-slip foaming layer. However, PU foaming material is a different kind of material from the choroprene rubber and styrenebutadiene rubber, which makes them have low binding capacity and hard to combine. The combined product is easy to separate from each other which influences its quality and service life. At the same time, the structure of existing floor mat is mostly made of PU (polyurethane) leather to be the top layer. It becomes harder to replace the top layer of as floor mat because its surface directly sticks to the PU layer in manufacturing. The floor mat would have to be replaced when it becomes hard to clean the top layer or when it gets ragged by over treading. As a result, it becomes neither economic nor environmental friendly.

Therefore, Inventor here makes a structural development to the existing PU self-skinning floor mat and invents a combined anti-slip floor mat.

SUMMARY OF THE INVENTION

The object of this invention is to provide a combined anti-slip floor mat.

A combined anti-slip floor mat which includes a mat body and a little mat, comprising:

the mat body includes a leather, a polyurethane middle layer, a PU self-skinning layer and an anti-slip layer stacked together in that order;

said polyurethane middle layer comprises non-foam polyurethane and mainly thrilled by an isocyanate with a polyether polyols, and the mass ratio of the isocyanate to the polyether polyols is 100:17~22;

said PU self-skinning layer comprises foaming polyurethane and mainly formed by foaming an isocyanate with a polyether polyols intermixture, and the mass ratio of the isocyanate to the polyether polyols intermixture is 100: 20~50;

a plurality of through holes passing through said anti-slip layer are defined in the anti-slip layer;

wherein said PU self-skinning layer adjacent to said anti-slip layer further comprises a plurality of rivets, said rivets pass through said through the holes and extend to a surface of said anti-slip layer away from said PU self-skinning layer;

wherein a recess is disposed in the middle of the top of the mat body, and the area of the recess is slightly less than the top area of the mat body; the little mat is matched to the recess in size.

Furthermore, the depth of the recess is in the range of 1-3 mm.

Furthermore, at least one opening is disposed on the middle of each side of the recess; wherein the opening passes through the floor mat.

Furthermore, the recess is square and has four sides.

Furthermore, a cross notch is made on the bottom of the floor mat, more specifically the anti-slip layer, by connecting each two opponent openings.

Furthermore, the size of the little mat matches the recess on the mat body, and is separably embedded in the recess.

Furthermore, the material of the little mat can be leather, carpet, flannelette and any other suitable material.

Furthermore, in order to prevent the little mat, which is embedded in the recess, from moving away, four cord locks or velcros are set on the little mat where is corresponding to the four openings on the mat body; said cord locks or velcros pass through the openings and each connects to the opponent cord lock or velcro along the cross notch, so as to fix the mat body.

Furthermore, the thickness of said leather ranges from 0.5 mm to 2.0 mm.

Furthermore, the thickness of said polyurethane middle layer ranges from 8 mm to 20 mm.

Furthermore, the thickness of said PU self-skinning layer ranges from 8 mm to 20 mm.

Furthermore, the thickness of said anti-slip layer ranges from 1 mm to 5 mm.

Furthermore, a shape of a cross section of said through holes on the anti-slip layer is round, rhombus, square, rectangular, triangular, parallelogram, or a combination of thereof.

Furthermore, the diameter of the cross section of said through holes ranges from 1 mm to 20 mm.

Furthermore, the polyether polyols intermixture includes polyether polyols, crosslinking agent, composite catalysts, surfactant, foaming agent; wherein the mass ratio of the polyether polyols, crosslinking agent, composite catalysts, surfactant and foaming agent is 100:2~8:1~2.5:0.5~1: 10~20.

Furthermore, the molecular weight of said polyether polyols is in a range from 1000 to 10000.

Furthermore, the molecular weight of said polyether polyols is about 5000.

Furthermore, said anti-slip layer is made of heat-shrink elastomer foaming layer or rubber foaming layer.

Furthermore, said rubber foaming layer is made of chloroprene rubber or styrene butadiene rubber.

Furthermore, a surface of said anti-slip layer away from said PU self-skinning layer further comprises an anti-slip texture.

Furthermore, said anti-slip texture is a plurality of convex structures arranged on the surface of said anti-slip layer.

Furthermore, the plurality of convex structures of the anti-slip layer's surface is concaved in the middle to form a plurality of suction cup structures.

This invention has the following advantages:

1. The anti-slip texture on the anti-slip layer has a good effect for anti-skidding. The anti-slip texture is made of a plurality of convex structures arranged on the surface of the anti-slip layer and a plurality of suction cup structures are arranged on the middle of the convex structure. As a result of this structure, the anti-slip layer here can have a better anti-skidding effect than general anti-slip texture.

2. The combined anti-slip floor mat disclosed in this invention comprises two parts: a mat body and a little mat. Such combined floor mat can be easily disassembled, and consequently people can easily replace the little mat when it gets dirty or worn by long-term treading or other reasons. This prevents the waste of throwing away the whole floor mat. This presents a more economic and environmental friendly floor mat. Moreover, the cord that locks on the little mat prevents the little mat which is embedded in the mat body, from moving away. Additionally, due to the cross notch set on the backside of the mat body, the cord locks of the little mat can be buried inside the mat body, and consequently prevents the cord locks from extending out the bottom surface of the mat body. This increases the safety of the floor mat.

DETAILED DESCRIPTION

Embodiment 1

Figure 1:
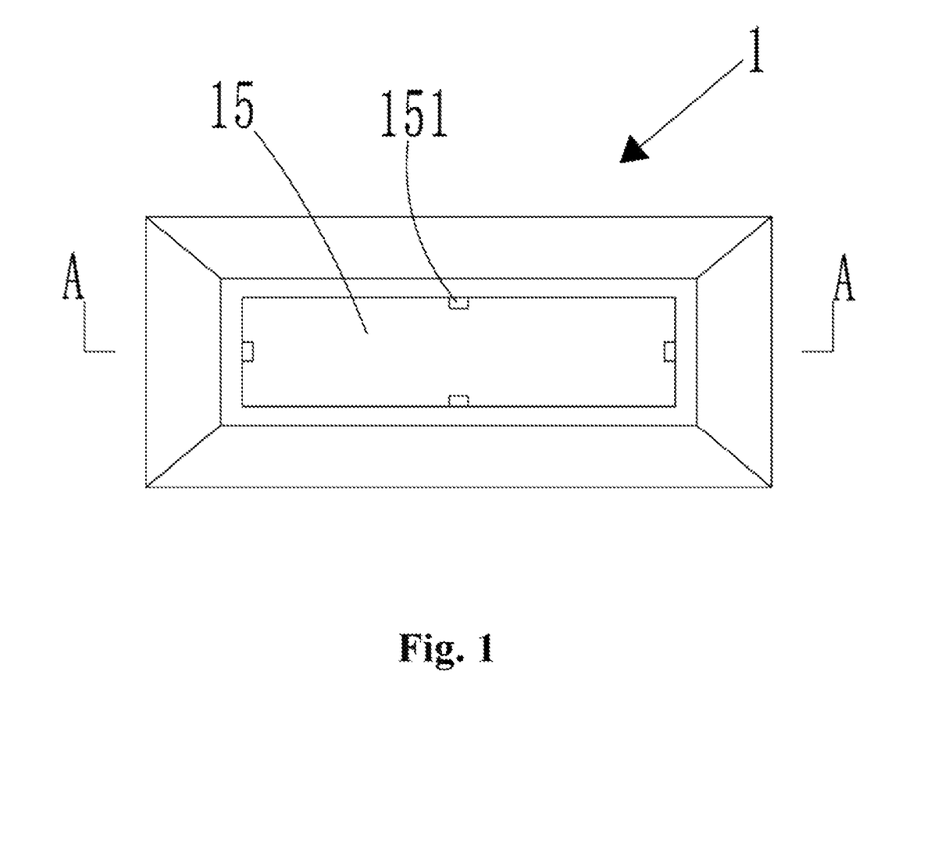
FIG. 1 illustrates a schematic diagram of the combined anti-slip floor mat (without the little mat).
Figure 2:
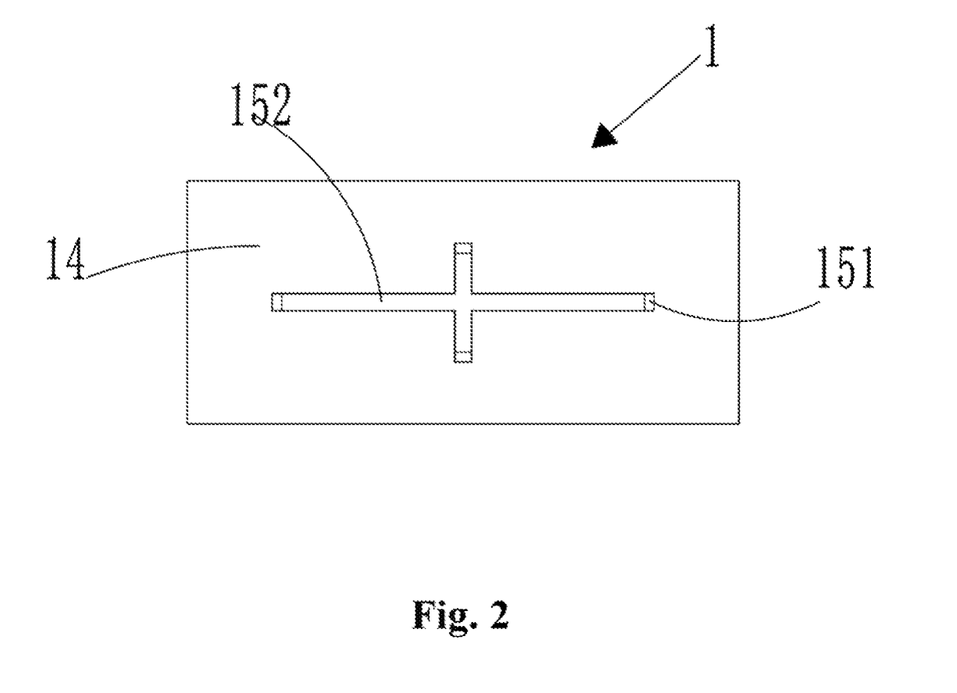
FIG. 2 illustrates the bottom of the combined anti-slip floor mat (without convex structures and through holes).
Figure 3:
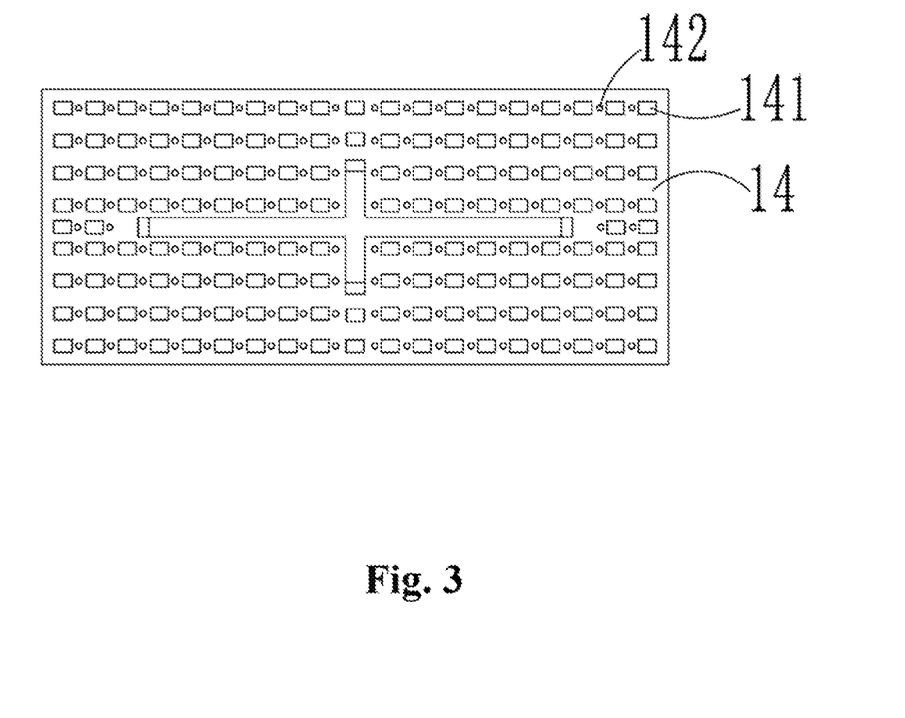
FIG. 3 illustrates the bottom of the combined anti-slip floor mat (with convex structures and through holes).
Figure 4:
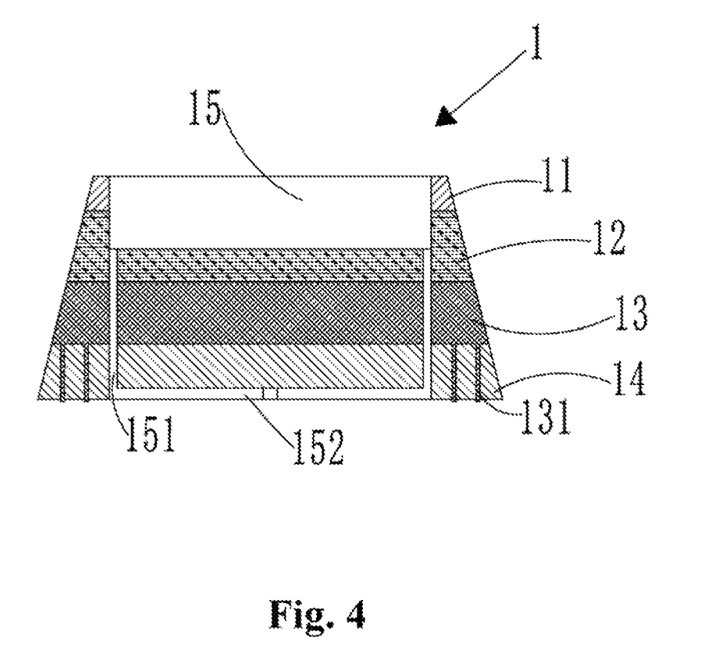
FIG. 4 illustrates the A-A section view of first embodiment of the combined anti-slip floor mat (without the little mat).
Figure 5:
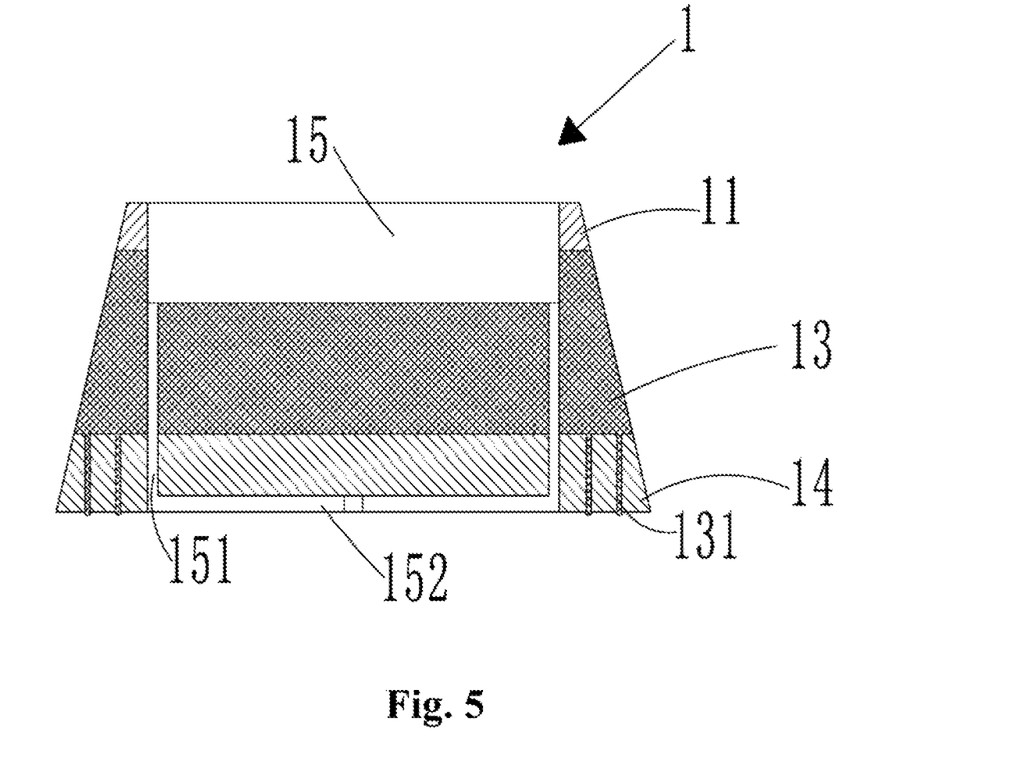
FIG. 5 illustrates the A-A section view of the second embodiment of the combined anti-slip floor mat (without the little mat).
Figure 6:
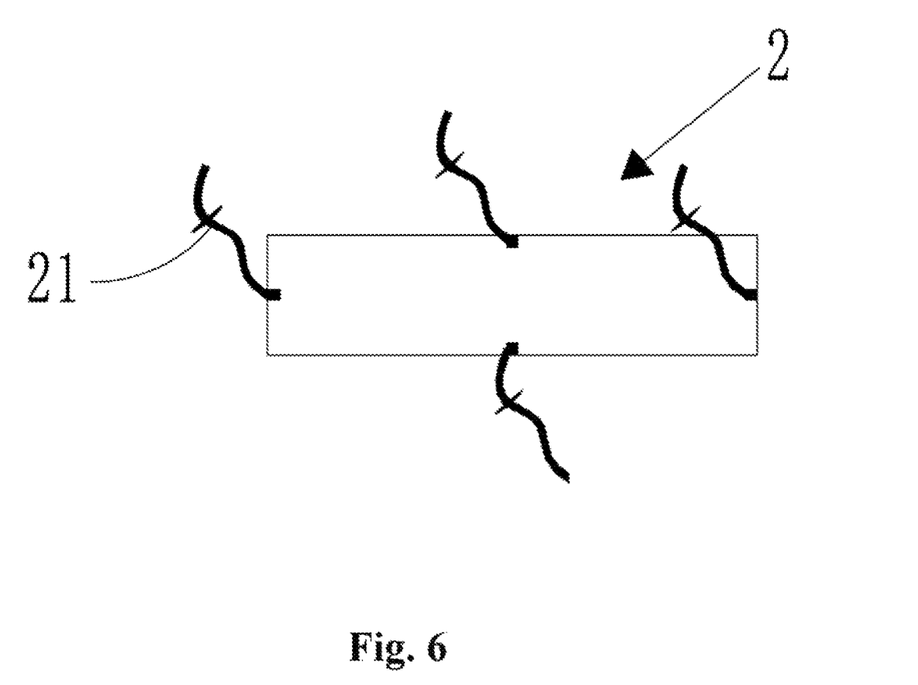
FIG. 6 illustrates the bottom of the little mat.

A combined anti-slip floor mat, including mat body 1 and little mat 2, winch comprising:

As shown in FIG. 4 and FIG. 5, mat body 1 includes leather 11. PU self-skinning layer 13, and anti-slip layer 14 stacked together in that order;

recess 15, as shown in FIG. 1, is disposed in the middle of the to of mat body 1, and the area of recess 15 is slightly less than the top area of mat body 1; as shown in FIG. 6, little mat 2 is matched to recess 15 in size. Preferably, the depth of recess 15 is in the range of 1-3 min. Wherein, at least one opening 151 is disposed on the middle of each side of recess 15; wherein opening 151 passes through floor mat; particularly, recess 15 is square and has four sides; as shown in FIG. 2 and FIG. 3, cross notch 15 is made on the bottom of mat body 1, more specifically the anti-slip layer 14, by connecting each two opponent openings 151; the size of little mat 2 matches recess 15 on mat body 1, and little mat 2 is separably embedded in recess 15. Preferably, the material of little mat 2 can be leather, carpet, flannelette and so on. In order to prevent little mat 2 which is embedded in recess 15 from moving away, as shown in FIG. 6, four cord locks or velcros 21 are set on little mat 2 where is corresponding to the four openings 151 on mat body 1; cord locks or velcros 21 pass through openings 151 and each connects to the opponent cord lock or velcro 21 along cross notch 152, so that little mat 2 can fix with mat body 1.

Wherein, leather 11 can be animal leather like sheep leather, cow leather, horse leather, pig leather, crocodile leather, etc. or other artificial leather or synthetic leather or combination thereof. Preferably the thickness of leather 11 ranges from 0.5 mm to 2.0 mm.

PU self-skinning layer 13 comprises foaming polyurethane and mainly foamed by foaming an isocyanate and a polyether polyols intermixture. The mass ratio of the isocyanate to the polyether polyols intermixture is 100:20~50. The polyether polyols intermixture includes polyether polyols, crosslinking agent, composite catalysts, surfactant, and foaming agent. Wherein the mass ratio of the polyether polyols, crosslinking agent, composite catalysts, surfactant and foaming agent is 100:2~8:1~2.5:0.5~1:10~20. The molecular weight of said polyether polyols is in the range of 1000~10000. Preferably, the molecular weight of said polyether polyols is about 5000. Said isocyanate and the polyether polyols intermixture are mixed under the temperature ranged from 20 to 30° C. During processing, the high-speed grinded and mixed isocyanate and polyether polyols intermixture has strong viscosity so that PU self-skinning layer 13 can stick to leather 11 directly. Preferably, the thickness of PU self-skinning layer 13 is in the range of 8-20 mm.

A plurality of through holes 142 is located in anti-slip layer 14. Accordingly, a plurality of rivets 131 is disposed on the surface of PU self-skinning layer 13 adjacent to anti-slip layer 14. A shape of a cross section of through holes 142 can be round, rhombus, square, rectangular, triangular, parallelogram or other irregular shape or a combination thereof. Anti-slip layer 14 can be a heat-shrink elastomer foaming layer or a rubber foaming layer, and more specifically, the rubber foaming layer can be a chloroprene rubber layer or a styrene butadiene rubber layer. Rivets 131 pass through through holes 142 and extend to the surface of anti-slip layer 14 away from PU self-skinning layer 13. Preferably, the thickness of anti-slip layer 14 ranges from 1 mm to 5 mm; the size of the cross section of through holes 142 is in the range of 1-20 mm.

Moreover, as shown in FIG. 3, the surface of anti-slip layer 14 away from PU self-skinning layer 13 further comprises an anti-slip texture. Said anti-slip texture is a plurality of convex structures 141 arranged on the surface of anti-slip layer 14 away from PU self-skinning layer 13. Convex structures 141 are concaved in the middle to form a plurality of suction cup structure.

Embodiment 2

A combined anti-slip floor mat, including mat body 1 and little mat 2, which comprising:

as shown in FIG. 5, mat body 1 includes leather 11, polyurethane middle layer 12, PU self-skinning layer 13, and anti-slip layer 14 stacked together in that order;

recess 15, as shown in FIG. 1 and FIG. 5, is disposed in the middle of the top of mat body 1, and the area of recess 15 is slightly less than the top area of mat body 1; as shown in FIG. 6, little mat 2 is matched to recess 15 in size. Preferably, the depth of recess 15 is in the range of 1-3 mm. Wherein, at least one opening 151 is disposed on the middle of each side of recess 15; wherein opening 151 passes through the mat body 1; particularly, recess 15 is square and has four sides; as shown in FIG. 2 and FIG. 3, cross notch 152 is made on the bottom of mat body 1, more specifically the anti-slip layer 14, by connecting each two opponent openings 151; as shown in FIG. 6, the size of little mat 2 matches recess 15 on mat body 1, and little mat 2 is separably embedded in recess 15. Preferably, the material of little mat 2 can be leather, carpet, flannelette and so on. In order to prevent little mat 2 which is embedded in recess 15 from moving away, four cord locks or velcros 21, as shown in FIG. 6, are set on little mat 2 where is corresponding to four openings 151 on mat body 1; said cord locks or velcros 21 pass through openings 151 and each connects to the opponent cord lock or velcro 21 along cross notch 152, so that little mat 2 can fix to mat body 1.

Wherein, the leather 11 can be animal leather like sheep leather, cow leather, horse leather, pig leather, crocodile leather, etc. or other artificial leather or synthetic leather or combination thereof. Preferably the thickness of leather 2 ranges from 0.5 mm to 2.0 mm.

Polyurethane middle layer 12 comprises non-foam polyurethane and mainly formed by curing an isocyanate and a polyether polyols, and the mass ratio of the isocyanate to the polyether polyols is 100:19~21. During the producing process, the isocyanate and the polyether polyols are grinding and mixing at a high speed to form a first mixture. A reaction between the isocyanate and the polyether polyols with the presence of a catalyst causes the curing and molding of the first mixture to form polyurethane middle layer 12. The first mixture has strong viscosity so that polyurethane middle layer 12 can stick to the surface of leather 11. When the mass ratio of the isocyanate to the polyether polyols is about 100:19, polyurethane middle layer 12 is slightly softer compared to a hardness standard: when the mass ratio of the isocyanate to the polyether polyols of the present is 100:20, polyurethane middle layer 12 conforms to the hardness standard; when the mass ratio of the isocyanate to the polyether polyols is 100:21, polyurethane middle layer 12 is slightly harder compared to the hardness standard. Preferably the thickness of polyurethane middle layer 12 ranges from 8 mm to 20 mm.

PU self-skinning layer 13 comprises foaming polyurethane and mainly foamed by foaming isocyanate and a polyether polyols intermixture. The mass ratio of the isocyanate to the polyether polyols intermixture is 100:20~50. The polyether polyols intermixture includes polyether polyols crosslinking agent, composite catalysts, surfactant, and foaming agent. Wherein the mass ratio of the polyether polyols crosslinking agent, composite catalysts, surfactant and foaming agent is 100:2~8:1~2.5:0.5~1:10~20. The molecular weight of said polyether polyols is in the range of 1000~40000. Preferably, the molecular weight of said polyether polyols is about 5000. Said isocyanate and the polyether polyols intermixture are mixed under the temperature ranged from 20 to 30° C. During processing, the high-speed grinded and mixed isocyanate and polyether polyols intermixture has strong viscosity so that PU self-skinning layer 13 can stick to leather 11 directly. Preferably, the thickness of PU self-skinning layer 13 is in the range of 8-20 mm.

A plurality of through holes 142 is located in anti-slip layer 14. Accordingly, a plurality of rivets 131 is disposed on the surface of PU self-skinning layer 12 adjacent to anti-slip layer 14. A shape of a cross section of through holes 142 can be round, rhombus, square, rectangular, triangular, parallelogram or other irregular shape or a combination thereof. Anti-slip layer 14 can be a heat-shrink elastomer foaming layer or a rubber foaming layer, and more specifically, the rubber foaming layer can be a chloroprene rubber layer or a styrene butadiene rubber layer. Rivets 131 pass through through holes 142 and extend to the surface of anti-slip layer 14 away from PU self-skinning layer 13. Preferably, the thickness of anti-slip layer 14 ranges from 1 mm to 5 mm; the size of the cross section of the through holes 142 is in the range of 1-20 mm.

Moreover, as shown in FIG. 3, the surface of anti-slip layer 14 away from PU self-skinning layer 13 further comprises an anti-slip texture. Said anti-slip texture is a plurality of convex structures 141 arranged on the surface of anti-slip layer 14 away from PU self-skinning layer 13. Convex structures 141 are concaved in the middle to form a plurality of suction cup structure.

Optionally, a thin foamed PU layer (not shown) can be disposed between the PU self-skinning layer and the anti-slip layer, said thin foamed PU layer can be glued to the anti-slip layer with glue. A plurality of the through holes passing through the anti-slip layer and the thin foamed PU layer are set on the anti-slip layer.

Although the present invention has been described with reference to the preferred embodiments, it is apparent to those skilled in the art that a variety of modification and changes may be made without departing from the scope of the patent for invention which is intended to be defined by the appended claims.

What claimed is:

1. A combined anti-slip floor mat, comprising: a mat body and a little mat; wherein
   the mat body comprises a leather, a PU self-skinning layer disposed under the leather, an anti-slip layer disposed under the PU self-skinning layer, and
   a plurality of convex structures on a back surface of the mat body;
   wherein, the plurality of convex structures are concaved in the middle to form a plurality of suction cup structures;
   the PU self-skinning layer comprises foaming material, and is formed by foaming an isocyanate and a polyether polyols intermixture;
   a plurality of through holes pass through the anti-slip layer; and
   the PU self-skinning layer further comprises a plurality of rivets, wherein the rivets pass through the plurality of through holes and extend to a surface of the anti-slip layer away from the PU self-skinning layer;
   a recess is disposed on the top of the mat body;
   wherein the little mat is matched to the recess in size and is separably embedded in the recess.

2. The combined anti-slip floor mat according to claim 1, wherein the area of the recess is smaller than the area of a top surface of the mat body, and the little mat is separably imbedded in the recess; wherein the depth of the recess is in the range of 1-3 mm.

3. The combined anti-slip floor mat according to claim 1, wherein at least one opening is disposed on the middle of each side of the recess; wherein the at least one opening passes through the floor mat; wherein a cross notch is made on the bottom of the mat body by connecting each two opponent openings.

4. The combined anti-slip floor mat according to claim 3, wherein the recess is square and has four sides.

5. The combined anti-slip floor mat according to claim 3, wherein the at least one opening includes four openings, at least four cord locks or velcros are set on the little mat and correspond to the four openings on the mat body; the at least four cord locks or velcros pass through the openings, and each connects to an opponent cord lock or velcro along the cross notch, so as to fix the mat body.

6. The combined anti-slip floor mat according to claim 1, wherein the material of the little mat is selected from a group consisting of: leather, carpet, and flannelette.

7. The combined anti-slip floor mat according to claim 1, wherein the mat body further comprises a polyurethane middle layer; the polyurethane middle layer is disposed between the leather and the PU self-skinning.

8. The combined anti-slip floor mat according to claim 7, wherein the polyurethane middle layer comprises non-foam polyurethane, and the polyurethane middle layer is formed by curing isocyanate and polyether polyols; wherein a plurality of color pastes is added in when the polyurethane middle layer is molding so as to dye the polyurethane middle layer.

9. The combined anti-slip floor mat according to claim 1, wherein a mass ratio of the isocyanate to the polyether polyols is in the range of 100:19~21.

10. The combined anti-slip floor mat according to claim 1, wherein the thickness of the polyurethane middle layer is in the range of 8-20 mm.

11. The combined anti-slip floor mat according to claim 1, wherein the thickness of the top surface is in the range of 0.5-2.0 mm.

12. The combined anti-slip floor mat according to claim 1, wherein the thickness of the PU self-skinning layer is in the range of 8-20 mm.

13. The combined anti-slip floor mat according to claim 1, wherein the thickness of the anti-slip layer is in the range of 1-5 mm.

14. The combined anti-slip floor mat according to claim 1, wherein the diameter of the cross section of the through holes ranges from 1 mm to 20 mm.

15. The combined anti-slip floor mat according to claim 1, wherein the polyether polyols intermixture includes polyether polyols, a crosslinking agent, composite catalysts, a surfactant, and a foaming agent; wherein the mass ratio of the polyether polyols, the crosslinking agent, the composite catalysts, the surfactant and the foaming agent is 100:2~8:1~2.5:0.5~1:10~20.

16. The combined anti-slip floor mat according to claim 15, wherein the molecular weight of said polyether polyols ranges from 1000 to 10000.

17. The anti-slip floor mat according to claim 1, wherein the anti-slip layer is made of a heat-shrink elastomer foaming layer or a rubber foaming layer.

18. The anti-slip floor mat according to claim 17, wherein the rubber foaming layer is made of chloroprene rubber or styrene butadiene rubber.

* * * * *